United States Patent [19]
Nakazato

[11] Patent Number: 4,809,828
[45] Date of Patent: Mar. 7, 1989

[54] ONE-WAY DAMPING VALVE MECHANISM FOR HYDRAULIC DAMPER

[75] Inventor: Kazuo Nakazato, Tochigi, Japan

[73] Assignee: Kabushiki Kaisha Showa Seisakusho, Tokyo, Japan

[21] Appl. No.: 69,037

[22] Filed: Jul. 1, 1987

[51] Int. Cl.$^4$ .............................................. F16F 9/348
[52] U.S. Cl. ................... 188/322.15; 188/320
[58] Field of Search ............ 188/282, 284, 297, 317, 188/320, 322.13, 322.15, 322.22

[56] References Cited

U.S. PATENT DOCUMENTS

| | | | |
|---|---|---|---|
| 2,320,697 | 6/1943 | Binder | 188/322.15 X |
| 2,740,500 | 4/1956 | Brundrett et al. | 188/322.15 |
| 4,512,447 | 4/1985 | Miura | 188/322.15 |

FOREIGN PATENT DOCUMENTS

| | | | |
|---|---|---|---|
| 0171131 | 10/1982 | Japan | 188/322.15 |
| 0197639 | 11/1984 | Japan | 188/322.15 |

Primary Examiner—Duane A. Reger
Attorney, Agent, or Firm—Bogucki, Scherlacher, Mok & Roth

[57] ABSTRACT

A one-way damping valve mechanism in a hydraulic damper having a first hydraulic chamber defined in a cylinder, and a piston rod having an inner end on which there is mounted a piston slidably fitted in the cylinder, divides the first hydraulic chamber into a second hydraulic chamber and a third hydraulic chamber. The valve mechansim produces a damping force when the piston is moved in a prescribed direction to move working oil from the second hydraulic chamber into the third hydraulic chamber. The valve mechanism comprises a subvalve for defining a first hydraulic passage to generate a damping force when the piston moves at an extremely low speed in the prescribed direction, and a main valve for defining a second hydraulic passage to generate a damping force when the piston moves in a medium/high speed range in the prescribed direction.

8 Claims, 19 Drawing Sheets

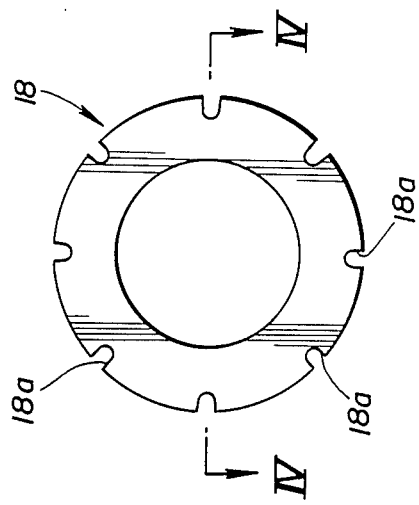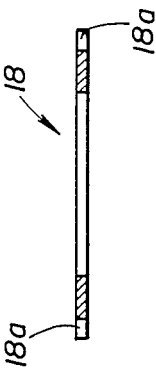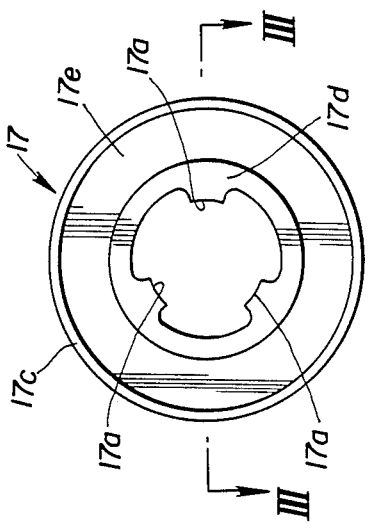

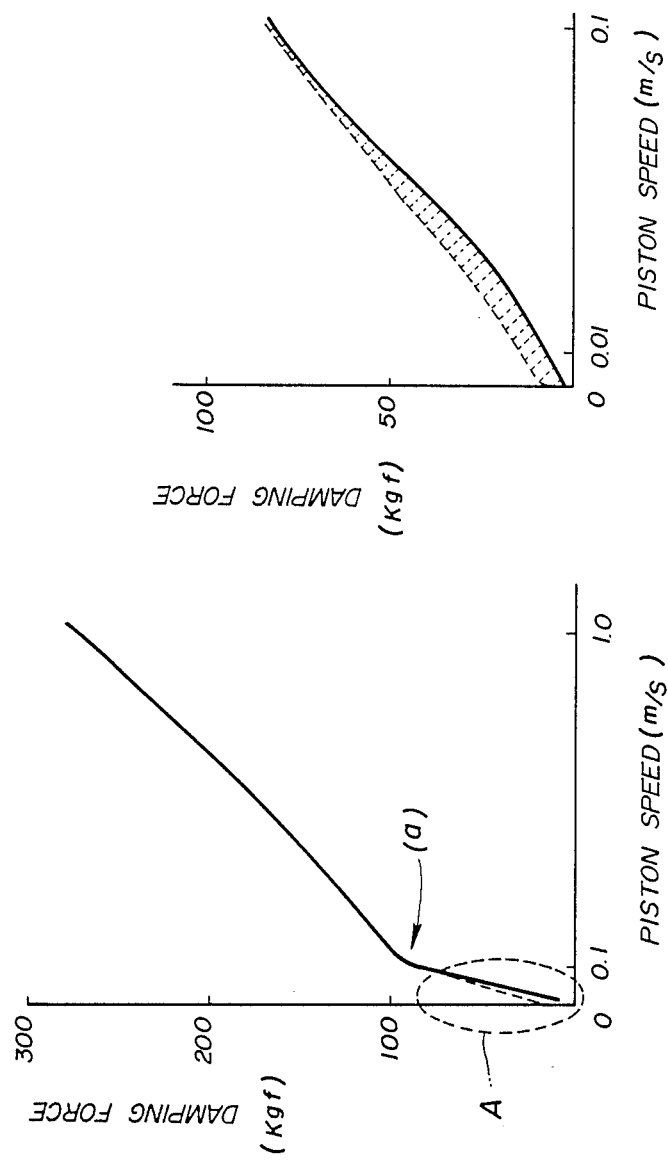

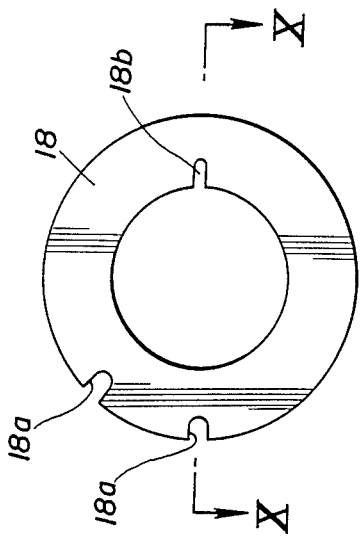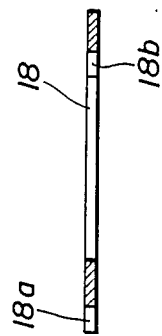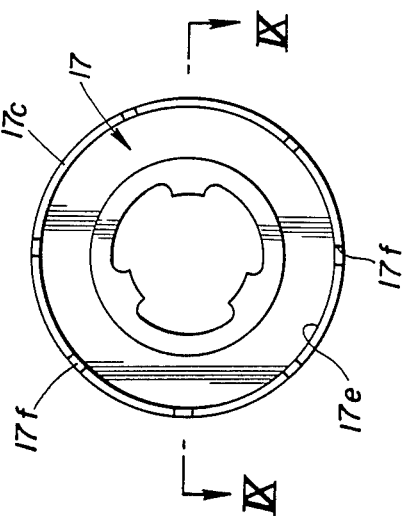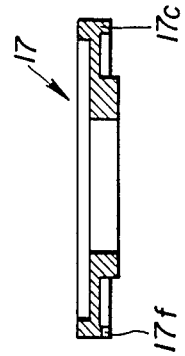

ONE-WAY DAMPING VALVE MECHANISM FOR HYDRAULIC DAMPER

BACKGROUND OF THE INVENTION

1. Field of the Invention

The present invention relates to a valve mechanism for use in a hydraulic damper, and more particularly to a one-way damping valve mechanism for a hydraulic damper for use in an automobile, a motorcycle, and the like.

2. Description of the Relevant Art

FIG. 23 of the accompanying drawings illustrates a known valve mechanism of the Sachs type for use as a one-way damping valve mechanism for a hydraulic damper for use in an automobile, a motorcycle, and the like. The valve mechanism is disposed between a piston rod 101 inserted in a cylinder 100 and a piston 103 fixed to a shank 102 of the piston rod 101. The piston 103 has a plurality of axial oil holes 103a defined therein. The interior space of the cylinder 100 is divided by the piston 103 into an upper hydraulic chamber S1 and a lower hydraulic chamber S2. A valve guide 104 having a plurality of axial oil holes 107a is interposed between a valve collar fitted over the shank 102 and the piston 103. In the valve guide 104, there is slidably fitted a valve seat 107 having a plurality of axial oil holes 107a. A valve 106 comprising a plurality of annular disc valve members is fitted in the valve guide 104 beneath the valve seat 107. The valve members of the valve 106 have central holes with their radius smaller than the radius of the central hub of the valve seat 107. A spring 108 having a relatively small spring constant is disposed between the upper surface of the valve seat 107 and the valve guide 104 for normally urging the valve seat 107 to move downwardly in FIG. 23. The lowermost valve member 105 of the valve 106 has a plurality of slits 105a defined in its outer peripheral edge.

The valve mechanism of the aforesaid construction generates a damping force during an expansion stroke when the piston 103 moves upwardly in FIG. 23 and produces substantially no damping force during a compression stroke when the piston 103 moves downwardly in FIG. 23. More specifically, when the piston 103 moves upwardly at a low speed that is 0.1 to 0.3 m/s in the expansion stroke, the valve 106 is not substantially flexed, and working oil in the upper hydraulic chamber S1 flows into the lower hydraulic chamber S2 through the slits of the valve guide 104, the slits 105a of the lowermost disc valve member 105, and the oil holes 103a. At this time, a prescribed damping force is generatd dependent on the resistance imposed on the oil flow by the slits 105a. In this condition, the upper surface of the inner periphery of the valve 106 remains in engagement with the lower surface of the inner periphery of the valve seat 107, with no oil passage defined therebetween. When the piston 103 moves upwardly at a medium or high speed this is, greater than 0.3 m/s in the expansion stroke, the inner periphery of the valve 106 is flexed downwardly under a hydraulic pressure buildup in the hydraulic chamber S1, defining an oil passage between the valve seat 107 and the valve 106. Working oil in the upper hydraulic chamber S1 flows into the lower hydraulic chamber S2 through the oil passage between the valve seat 107 and the valve 106 as well as the slits 105a. At this time, a relatively large damping force is generated by the valve members of the valve 106. The damping force generated when the piston 103 moves at a low speed can appropriately be selected by adjusting or varying the cross-sectional area of the slits 105a. When the piston 103 moves downwardly in the compression stroke, the valve 106 and the valve seat 107 are displaced upwardly against the bias of the spring 108, so that the working oil in the lower hydraulic chamber S2 is caused to flow through the oil holes 103a and the slits of the valve guide 104 into the upper hydraulic chamber S1. At this time, virtually no resistance to the oil flow is present, and virtually no damping force is produced.

Heretofore, the sliding surfaces of the hydraulic damper such as the outer circumferential surface of the piston 103 and the inner circumferential surface of the cylinder 100 are subject to a relatively large degree of frictional resistance which acts as a damping force when the piston 103 moves upwardly at the low speed during the expansion stroke. This damping force is effective to give suitable riding comfort during low-speed travel of the piston 103 in the expansion stroke. However, various recent improvements have resulted in reduced coefficients of friction of such sliding surfaces. Therefore, the damping force produced when the piston moves at the low speed in the expansion storke tends to be so reduced that any suitable riding comfort can be obtained by the damper. This problem could be solved by reducing the cross-sectional area of the slits 105a of the disc valve member 105 of the valve 106. However, only such a solution would fail to compensate for a shortage of damping force when the piston would move at an extremely low speed this is, less than 0.1 m/s. Moreover, no smooth damping transient would be achieved since the damping force would abruptly be increased when the piston speed would change from the extremely-low-speed/low-speed range to the medium-speed/high-speed range.

Japanese Laid-Open Patent Publication No. 56-20846 published Feb. 26, 1981 discloses a valve mechanism having a disc-shaped subvalve disposed below the valve 106 of FIG. 23 for generating a required damping force when the piston moves at the extremely low speed or the low speed. The disclosed valve mechanism controls the damping force in multiple stages when the piston moves at low speeds. The subvalve has disc valve members with their inner peripheries limited against upward movement by the outer peripheral edge of a stopper fixed to the valve collar. During the compression stroke of the piston, the outer periphery of the disc valve members of the subvalve are flexed to define an oil passage between the subvalve and the piston. Consequently, this valve mechanism produces a damping force also during the compression stroke of the piston. The valve mechanism disclosed in the above publication is not suitable for use as a one-way damping valve mechanism which is required to produce a damping force only when the piston moves in one direction.

The present invention has been made in an effort to eliminate the problems experienced by the conventional one-way damping valve mechanism as shown in FIG. 23 of the accompanying drawings.

SUMMARY OF THE INVENTION

It is an object of the present invention to provide a one-way damping valve mechanism for use in a hydraulic damper, which can produce a sufficient damping force when a piston moves at an extremely low speed and which has a smooth damping transient achieved by a smooth damping force increase when the speed of movement of the piston changes from an extremely-low-speed/low-speed range to a medium-speed/high-speed range.

To accomplish the above object, there is provided a one-way damping valve mechanism in a hydraulic damper having a cylinder, a first hydraulic chamber defined in the cylinder, a piston slidably fitted in the cylinder, and a piston rod having an inner end on which the cylinder is mounted, the valve mechanism dividing the first hydraulic chamber into a second hydraulic chamber and a third hydraulic chamber, the valve mechanism being arranged to produce a damping force when the piston is moved in a prescribed direction to move working oil from the second hydraulic chamber into the third hydraulic chamber, the valve mechanism comprising a subvalve for defining a first hydraulic passage to generate a damping force when the piston moves at an extremely low speed in the prescribed direction, and a main valve for defining a second hydraulic passage to generate a damping force when the piston moves in a medium/high speed range in the prescribed direction.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3A is a bottom view of a separator of the valve mechanism;

FIG. 3B is a cross-sectional view taken along line III—III of FIG. 3A;

FIG. 4A is a bottom view of a slit valve of the valve mechanism;

FIG. 4B is a cross-sectional view taken along line IV—IV of FIG. 4A;

FIG. 7 is a graph showing the relationship between the piston speed and generated damping force in the hydraulic damper;

FIG. 8 is a graph showing, at an enlarged scale, an encircled area A in FIG. 7;

FIG. 9A is a bottom view of a modified separator;

FIG. 9B is a cross-sectional view taken along line IX—IX of FIG. 9A;

FIG. 10A is a bottom view of a slit valve;

FIG. 10B is a cross-sectional view taken along line X—X of FIG. 10A;

DETAILED DESCRIPTION OF THE PREFERRED EMBODIMENTS

Figure 1:
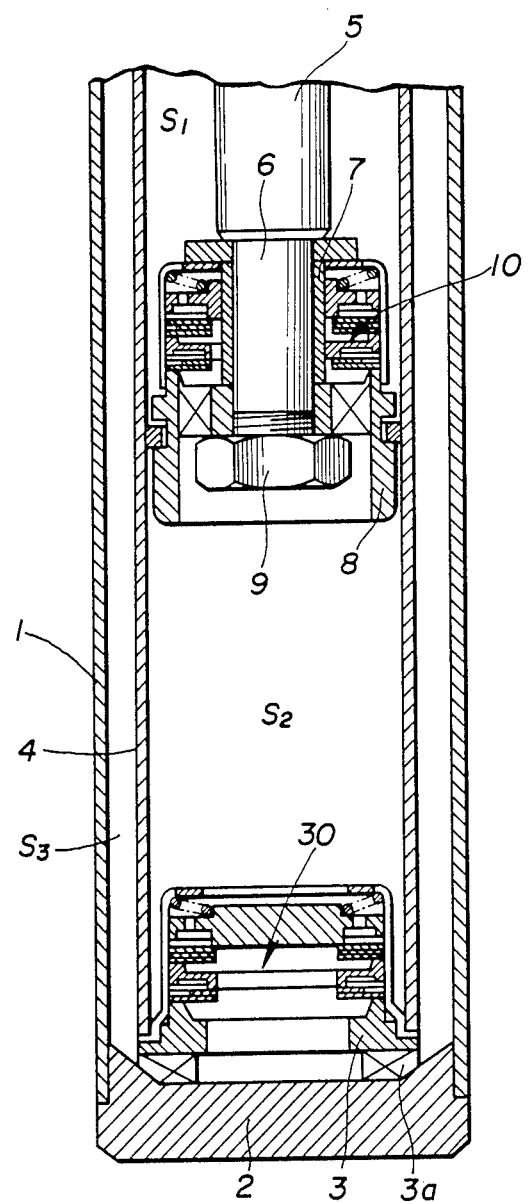
FIG. 1 is a cross-sectional view of a lower portion of a hydraulic damper incorporating a one-way damping valve mechanism according to a first embodiment of the present invention.
Figure 2:
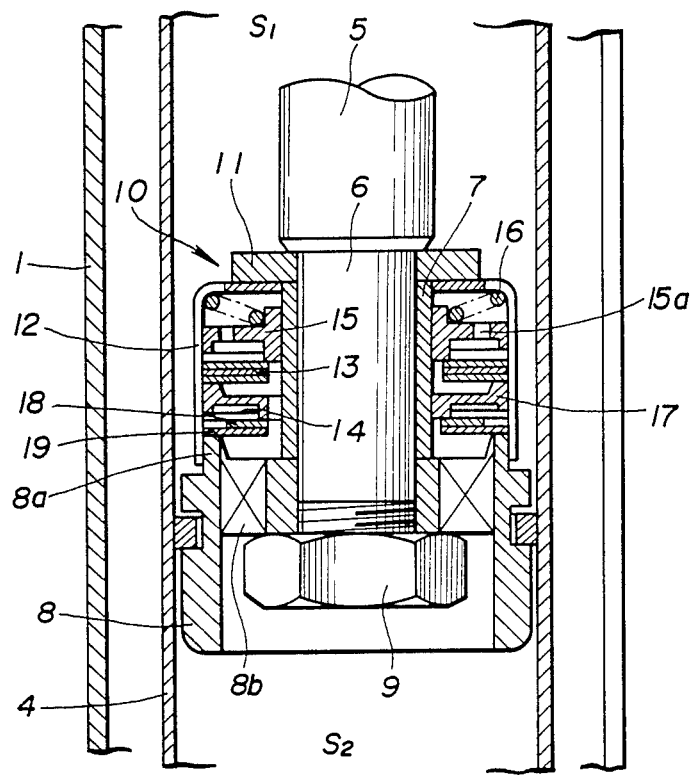
FIG. 2 is an enlarged fragmentary cross-sectional view of the valve mechanism.

FIG. 1 shows in cross section a lower portion of a hydraulic damper incorporating therein a one-way damping valve mechanism according to the present invention. The hydraulic damper has an outer cylinder 1 with its open bottom closed off by a cap 2, and an inner cylinder 4 disposed in the outer cylinder 1 and having a lower end fixed to a bottom piece 3 disposed on the cap 2, the outer and inner cylinders 1, 4 jointly defining a hydraulic reservoir chamber S3 therebetween. A piston rod 5 having a smaller-diameter lower end 6 supporting a valve collar 7 thereon is vertically slidably inserted in the inner cylinder 4. The upper end (not shown) of the piston rod 5 is coupled to a motor vehicle frame (not shown). The cap 2 is coupled to a wheel shaft (not shown). A piston 8 is fixed to the smaller-diameter lower end 6 below the valve collar 7 by means of a nut 9, the piston 8 having an outer peripheral surface held in slidable contact with the inner peripheral surface of the inner cylinder 4. The piston 8 has a plurality of axial oil holes 8b (FIG. 2). The valve collar 7 serves to position the piston 8 on the smaller-diameter lower end 6 of the piston rod 5. The piston 8 divides the interior space or hydraulic chamber of the inner cylinder 4 into an upper hydraulic chamber S1 and a lower hydraulic chamber S2. The hydraulic S2 is held in communication with the hydraulic reservoir chamber S3 through oil holes 3a defined in the bottom piece 3. A one-way damping valve mechanism 10 according to a first embodiment of the present invention is disposed around the valve collar 7 above the piston 8. A modification 30 of such a one-way damping valve mechanism is disposed on the upper surface of the bottom piece 3. The bottom valve mechanism 30 will be described later on.

The piston 8 moves at various speeds. i.e., an extremely low speed, a low speed, and a medium/high speed, which will be referred to below. By way of example only, and as previously defined, the extremely low speed may range from less than 0.01 m/s, the low speed may range from 0.1 to 0.3 m/s, and the medium/-high speed may be greater than 0.3 m/s.

As illustrated in FIG. 2, the valve mechanism 10 has a valve guide 12 interposed between an axially projecting edge 8a on the upper outer periphery of the piston 8 and a support plate 11 mounted on the smaller-diameter lower end 6 near a step on the piston rod 5. The valve guide 12 has a plurality of axial slits defined in its outer peripheral wall. In the valve guide 12, there are disposed a main valve 13 disposed around the valve collar 7 and openable when the piston 8 moves at the medium/high speed during the expansion stroke of the damper and a subvalve 14 disposed around the valve collar 7 and openable when the piston 8 moves at the extremely low speed and the low speed.

The main valve 13 has a plurality of annular disc valve members of identical configuration, the main valve 13 having its outer periphery held against the inner peripheral surface of the leg or outer peripheral wall of the valve guide 12. The main valve 13 has an inside diameter larger than the outside diameter of the valve collar 7, defining a gap between the main valve 13 and the valve collar 7. The main valve 13 includes a valve seat 15 slidably fitted over the valve collar 7 in the valve guide 12 and having a plurality of axial oil holes 15a of relatively large diameter. A spring 16 of a relatively small spring constant is disposed between the upper surface of the valve seat 15 and the valve guide 12 for normally urging the valve seat 15 in a direction to keep the upper surface of the inner periphery of the main valve 14 in engagement with the lower surface of the inner peripheral portion or hub of the valve seat 15 without any gap therebetween.

The subvalve 14 is disposed underneath the main valve 13 and comprises a separator 17, a slit valve 18, and a backup valve 19 which are disposed inwardly of the leg of the valve guide 12. As shown in FIGS. 3A and 3B, the separator 17 is of a substantially annular shape having a central opening through which the valve collar 7 extends. The separator 17 has radially inward projections or teeth 17a held against the valve collar 7. The separator 17 also has an annular ridge 17b on its upper surface around the outer peripheral edge for supporting the lower surface of the outer periphery of the main valve 13, and an annular ridge 17c on the lower surface around the outer peripheral edge. The separator 17 has an anular groove 17e defined radially between a central raised portion 17d on the lower surface thereof and the annular ridge 17c. The lower surface of the central raised portion 17d projects downwardly beyond the lower end of the annular ridge 17c and is held against the upper surface of the inner periphery of the slit valve 18. As illustrated in FIGS. 4A and 4B, the slit valve 18 has a central opening through which the valve collar 7 is inserted and a plurality of slits 18a defined at equal intervals in the outer peripheral edge. The backup valve 19 is in the form of a single annular disc valve having a central hole. The central holes of the slit valve 18 and the backup valve 19 have a diameter greater than the outside diameter of the valve collar 7.

Operation of the valve mechanism 10 will be described with reference to FIGS. 2, 5 through 8.

Figure 23:
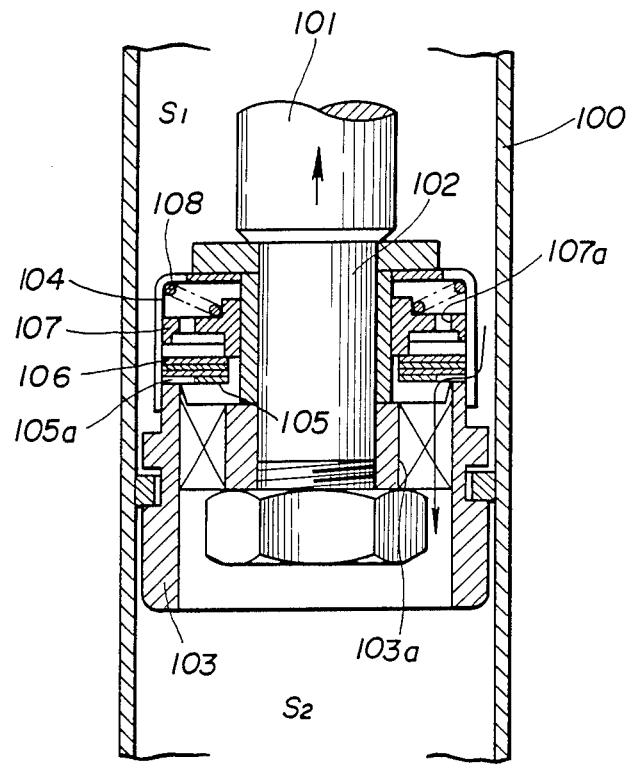
FIG. 23 is a fragmentary cross-sectional view of a conventional one-way damping valve mechanism for a hydraulic damper.

FIG. 7 is a graph showing the relationship between speeds of the piston 8 in the hydraulic damper from the extremely-low/low-speed range to the medium/high speed range and damping forces generated by the valve mechanism 10. FIG. 8 shows at an enlarged scale an encircled area A of FIG. 7. The horizontal axis of the graph of FIG. 8 is graduated in a smaller scale than the hozizontal axis of the graph of FIG. 7. Therefore, the gradients of the curves of FIG. 8 are shown as being smaller than those of the curves of FIG. 7. The solid-line curve portions shown in FIGS. 7 and 8 are representative of the conventional valve mechanism shown in FIG. 23, whereas the dotted-line curve portions indicate the valve mechanism 10 of the present invention.

Immediately after the expansion stroke of the piston 8 is started by upward movement of the piston 8, hydraulic pressure in the upper hydraulic chamber S1 is not great enough to flex the inner peripheral portions of the slit valve 18 and the backup valve 19 downwardly. Therefore, as shown in FIG. 2, no oil passage or gap is present which would communicate between the upper and lower hydraulic chambers S1, S2.

Figure 5:
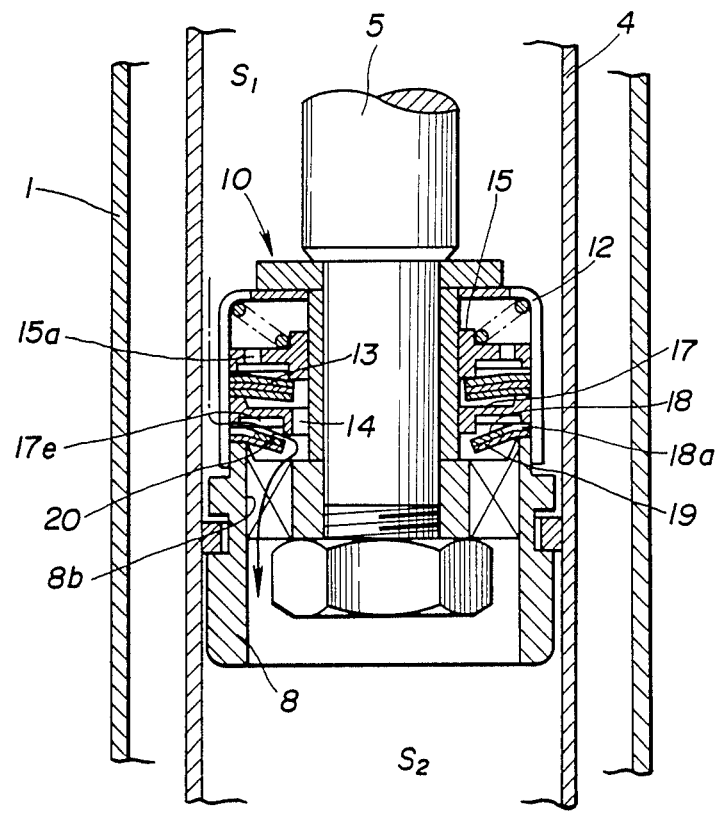
FIG. 5 is an enlarged fragmentary cross-sectional view showing the valve mechanism when a piston moves in an extremely-low/low speed range in an expansion stroke.

When the piston 8 reaches the extremely low speed, hydraulic pressure in the groove 17e which communicates with the upper hydraulic chamber S1 through the slits of the valve guide 12 and the slits 18a of the slit valve 18 is increased. The inner peripheral portions of the slit valve 18 and the backup valve 19 are then caused by such a pressure buildup to flex downwardly, defining an oil passage 20 between these flexing inner peripheral portions and the separator 17, as shown in FIG. 5. The working oil in the upper hydraulic chamber S1 now flows into the lower hydraulic chamber S2 through the slits of the valve guide 12, the groove 17e, the oil passage 20, and the piston oil holes 8b. As shown in FIG. 8, the damping force curve increases from a certain value higher than zero because of formation of the oil passage 20. In the low speed range for the piston during the expansion stroke, the damping force generated by the valve mechanism 10 increases substantially in proportion to the piston speed.

Figure 6:
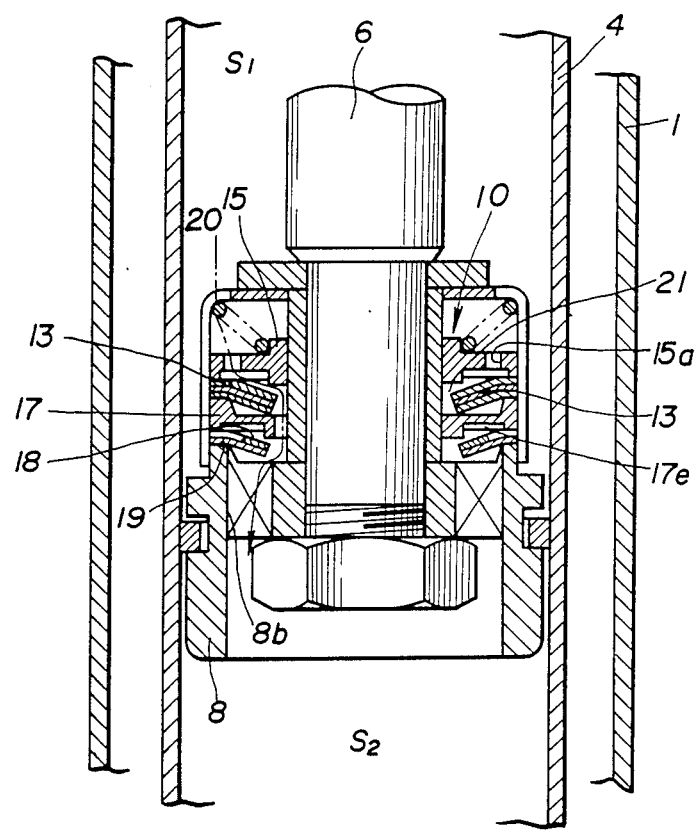
FIG. 6 is an enlarged fragmentary cross-sectional view showing the valve mechanism when the piston moves in a medium/high speed range in the expansion stroke.

When the speed of travel of the piston 8 in the expansion stroke exceeds 0.3 m/s, the hydraulic pressure in the upper hydraulic chamber S1 further increases, and so does the hydraulic pressure acting on the upper surface of the main valve 13 through the oil holes 15a of the valve seat 15. As illustrated in FIG. 6, the inner peripheral portion of the main valve 13 is caused to flex downwardly, thus defining an oil passage 21 between the lower surface of the central hub of the valve seat 15 and the upper surface of the inner periphery of the valve seat 13. The working oil in the upper hydraulic chamber S1 flows into the lower hydraulic chamber S2 through the oil passage 21 as well as the oil passage 20.

Such an oil influx into the lower hydraulic chamber S2 is caused at a so-called blow-off point indicated at (a) in FIG. 7. Thereafter, the speed of travel of the piston 8 in the expansion stroke and the damping force generated by the valve mechanism 10 are of the same relationship as is the case with the conventional valve mechanism illustrated FIG. 23.

Figure 6A:
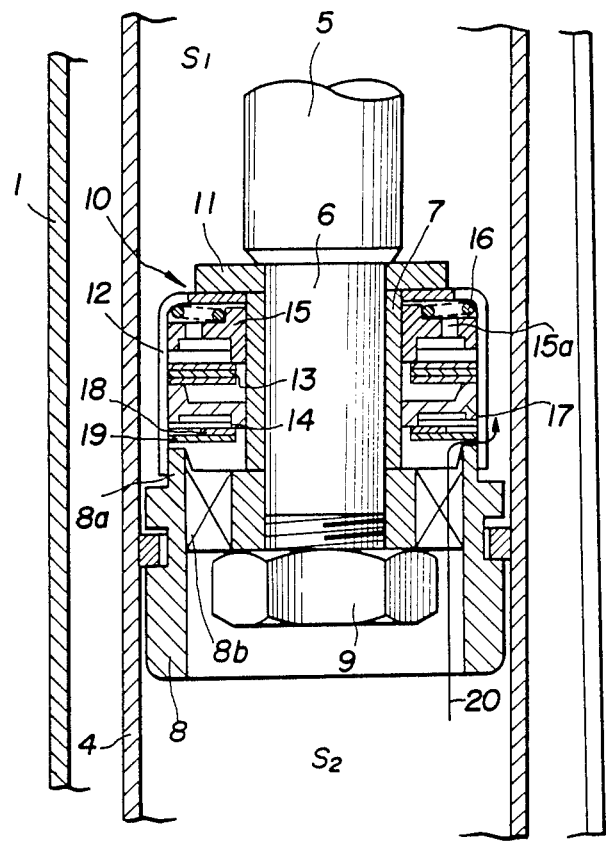
FIG. 6A is an enlarged fragmentary cross-sectional view showing the valve mechanism when the piston moves in a compression stroke.

When the piston 8 is moved downwardly in the compression stroke, the subvalve 14 and the main valve 13 move upwardly against the resilient force of the spring 16, permitting the working oil in the lower hydraulic chamber S2 to flow into the upper hydraulic chamber S1 through the piston oil holes 8b and the slits of the valve guide 12 as indicated by flow path 20 shown in FIG. 6A. At this time, the oil flow is subjected to substantially no resistance, and the valve mechanism 10 virtually does not produce damping forces.

The valve mechanism 10 has the main valve 13 which opens to generate a damping force when the piston 8 is moved in the medium/high speed range in the expansion stroke, and the subvalve 14 which opens to produce a damping force when the piston 8 is moved in the extremely-low speed range in the expansion stroke. The subvalve 14 makes it possible for the valve mechanism 10 to produce the same damping force upon expansion movement of the piston 8 in the medium/high speed range as the damping force produced by the conventional valve mechanism, and to produce a suitable damping force upon expansion movement of the piston 8 at the extremely low speed and the low speed. As can be understood from FIG. 7, the damping force generated by the valve mechanism 10 does not abruptly change when the expansion speed of piston 8 is shifted from the extremely-low/low speed range into the medium/high speed range, so that a smooth damping force transient can be obtained across the blow-off point.

FIGS. 9A and 9B show a modification of the separator 17. The annular ridge 17c on the lower surface of the outer peripheral edge of the separator 17 has a plurality of grooves 17f defined at equal intervals in the circumferential direction. When the modified separator 17 is employed, the slit valve 18 shown in FIG. 2 may be dispensed with. More specifically, the grooves 17f serve as substitutes for the slits 18a of the slit valve 18. With the slit valve 18 omitted, the upper surface of the backup valve 19 directly engages the lower surface of the separator 17.

Figure 11:
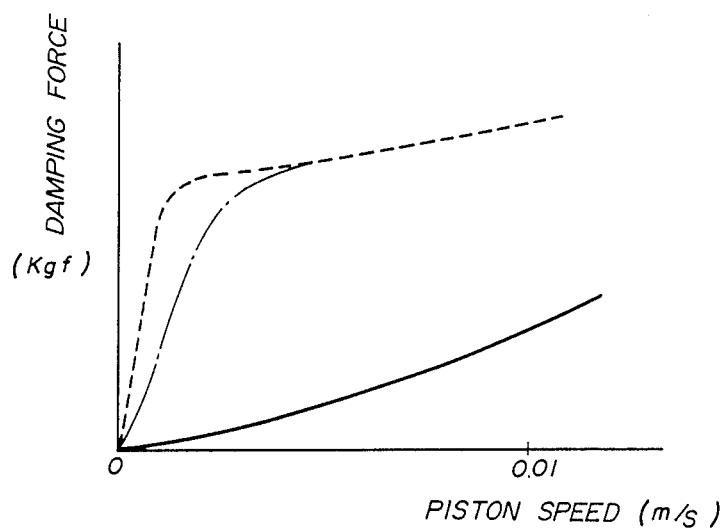
FIG. 11 is a graph illustrating the relationship between the piston speed and generated damping force when a piston having the slit valve of FIG. 10 moves at an extremely low speed in the expansion stroke.

FIGS. 10A and 10B show a modification of the slit valve 18. The modified slit valve 18 has an additional slit 18b defined in its inner peripheral edge, the slit 18b having its area smaller than that of the slits 18a defined in the outer peripheral edge of the slit valve 18. The slit 18b allows fluid communication between the upper hydraulic chamber S1 and the lower hydraulic chamber S2 at all times. Therefore, as indicated by the dot-and-dash line in FIG. 11, the damping force produced by a valve mechanism employing such a modified slit valve increases at a gradient smaller than that of the damping force produced by the valve mechanism shown in FIG. 2 when the piston 8 moves at the extremely low speed in the expansion stroke. This damping force characteristic improves the riding comfort.

Figure 12:
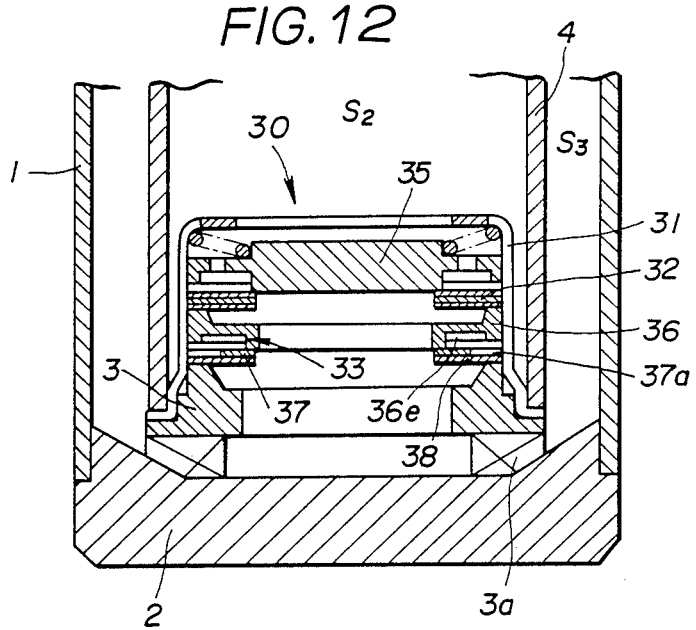
FIG. 12 is a cross-sectional view of a bottom valve in the hydraulic damper shown in FIG. 1, the bottom valve being a modified one-way damping valve mechanism.

FIG. 12 shows at an enlarged scale the bottom valve mechanism 30 employed in the hydraulic damper shown in FIG. 1. The bottom valve mechanism 30 is of substantailly the same structure and function as those of the valve mechanism 10. However, the bottom valve mechanism 30 produces a damping force only during the compression stroke of the piston 8, and virtually does not produce a damping force during the expansion stroke of the piston 8.

The valve mechanism 30 has its outer peripheral edge on the lower end fixedly clamped between the upper surface of the outer periphery of the bottom piece 3 and the lower end of the inner cylinder 4. The valve mechanism 30 also has a valve guide 31 having a plurality of slits defined in its outer circumferential wall. In the valve guide 31, there are disposed a main valve 32 openable when the piston 8 moves at the medium/high speed during the compression stroke and a subvalve 33 openable when the piston 8 moves at the extremely low speed and the low speed. The main valve 32 has a pluraltiy of annular disc valve members of identical configuration, the main valve 32 having its outer periphery held against the inner peripheral surface of the valve guide 31. The main valve 32 includes a valve seat 35 slidably held against the inner peripheral surface of the valve guide 31. A spring of a relatively small spring constant is disposed between the upper surface of the valve seat 35 and the valve guide 31. The subvalve 33 is disposed underneath the main valve 32 and comprises a separator 36, a slit valve 37, and a backup valve 38 which are disposed inwardly of the leg or the circumferential wall of the valve guide 31. The separator 36 has an annular groove 36e defined in the lower surface thereof. The slit valve 37 has a plurality of slits 37a defined in the outer peripheral edge thereof. The groove 36e and the slits 37a are identical to the groove 17e and the slits 18a, respectively, shown in FIGS. 3A, 3B, 4A, and 4B. The manner in which the valve mechanism 30 functions during the compression and expansion strokes of the piston 8 will not be described as it appears apparent to those skilled in the art.

Figure 13:
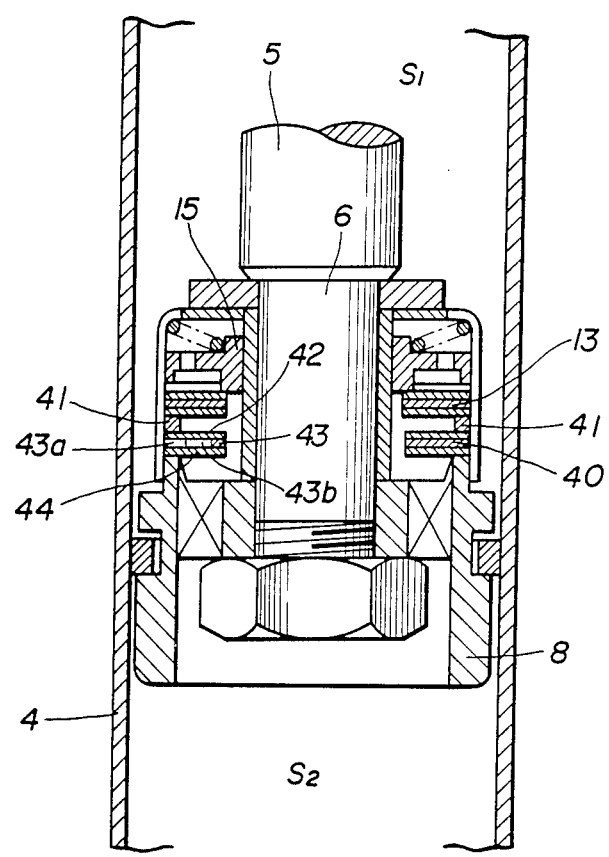
FIG. 13 is a cross-sectional view of a one-way damping valve mechanism according to a second embodiment of the present invention.
Figure 14A:
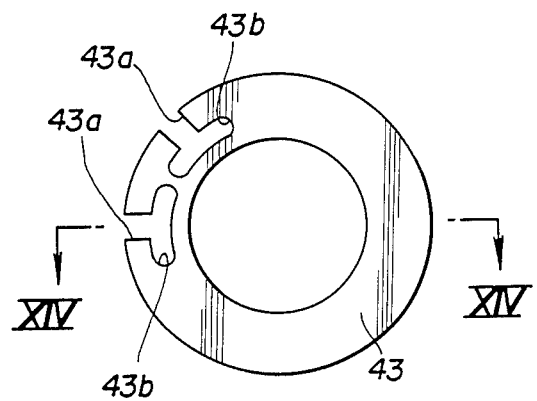
FIG. 14A is a bottom view of a groove valve of the valve mechanism shown in FIG. 13.
Figure 14B:
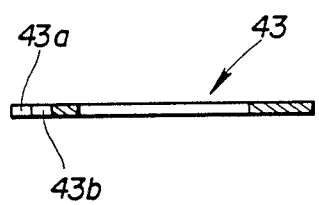
FIG. 14B is a cross-sectional view taken along line XIV—XIV of FIG. 14A.

FIG. 13 shows a one-way damping valve mechanism according to a second embodiment of the present invention. Those parts which are identical to those shown in FIG. 2 are denoted by identical reference numerals and will not be described in detail. The valve mechanism of the second embodiment has a subvalve 40 disposed below the main valve 13 and comprising a separator 41, a shutoff valve 42, a groove valve 43, and a backup valve 44 which are disposed inwardly of the leg or the circumferential wall of the valve guide. The groove valve 43 is sandwiched between the shutoff valve 42 and the backup valve 44. The separator 41 is vertically slidably fitted within the leg of the valve guide. As shown in FIGS. 14A and 14B, the groove valve 43 has a plurality of slits 43a defined in the outer peripheral edge thereof, and a plurality of grooves 43b defined radially inwardly of the respective slits 43a and contiguous thereto.

Figure 15:
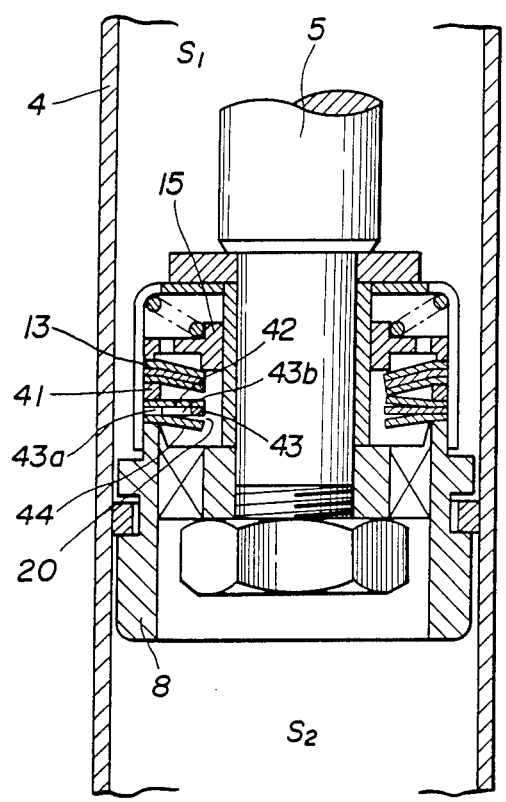
FIG. 15 is an enlarged fragmentary cross-sectional view showing the valve mechanism of FIG. 14 when a piston moves in an extremely-low/low speed range in an expansion stroke.

Right after the upward expansion stroke of the piston 8 begins, hydraulic pressure in the upper hydraulic chamber S1 is not high enough to cause the inner peripheral portion of the backup valve 44 to flex downwardly. Therefore, as shown in FIG. 13, no oil passage or gap is present which would otherwise provide fluid communication between the upper and lower hydraulic chambers S1, S2. As the piston 8 reaches the extremely low speed on its upward travel, a pressure buildup is developed in the grooves 43b communicating with the upper hydraulic chamber S1. Therefore, as shown in FIG. 15, the inner peripheral portion of the backup valve 44 is flexed downwardly, defining an oil passage 20 between itself and the inner peipheral portion of the groove valve 43. As shown in FIG. 7, the damping force increases from a value greater than zero because of formation of the oil passage 20.

The valve mechanism shown in FIG. 13 offers the same advantages as those of the valve mechanism 10 shown in FIG. 2. In addition, the separator 41 and the shutoff valve 42 may be of simple shapes.

Each of the shutoff valve 42 and the backup valve 44 is in the form of a disc valve, and the rigidity of the shutoff valve 42 is greater than the rigidity of the backup valve 44. When the rigidity of the shutoff valve 42 is equal to or smaller than that of the backup valve 44, the inner peripheral portion of the shutoff valve 42 is also caused to flex upwardly during the expansion stroke of the piston 8 at the extremely low speed, providing a further oil passage between the shutoff valve 42 and the groove valve 43. Consequently, the damping force curve is of a smaller gradient than that of the damping force curve of the valve mechanism of FIG. 2 upon the expansion stroke of the piston 8 at the extremely low speed.

Figure 16:
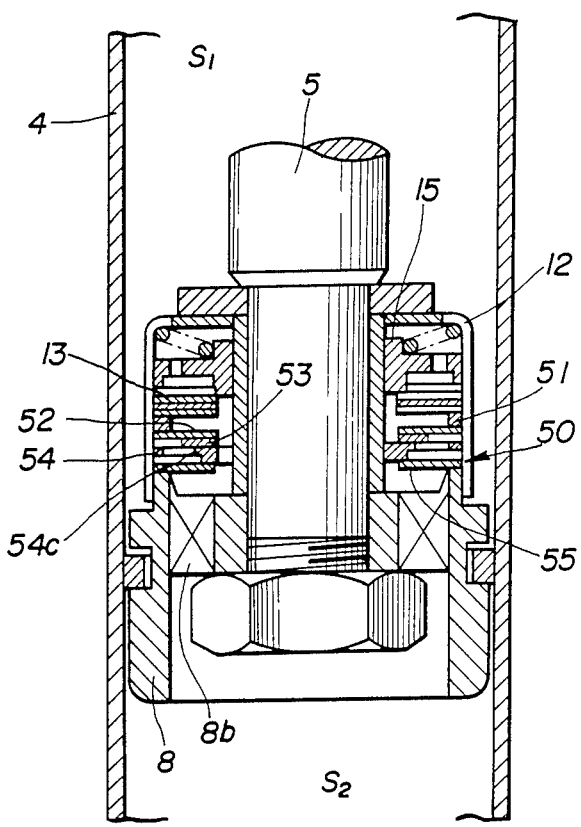
FIG. 16 is a cross-sectional view of a one-way damping valve mechanism according to a third embodiment of the present invention.
Figure 17A:
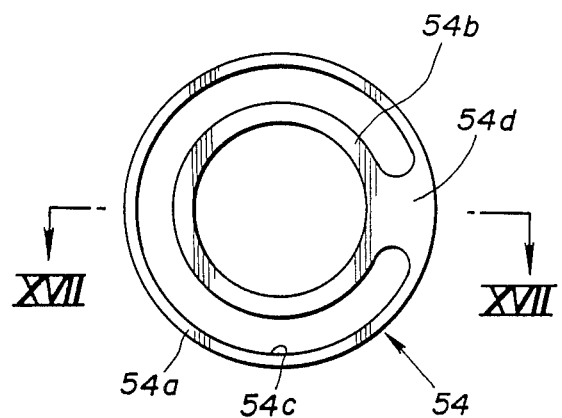
FIG. 17A is a bottom view of a groove valve of the valve mechanism shown in FIG. 16.
Figure 17B:
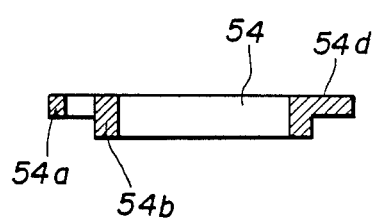
FIG. 17B is a cross-sectional view taken along line XVII—XVII of FIG. 17A.

FIG. 16 illustrates a one-way damping valve mechanism according to a third embodiment of the present invention. Those parts which are identical to those shown in FIG. 2 are denoted by identical reference numerals and will not be described in detail. The valve mechanism of the second embodiment has a subvalve 50 disposed below the main valve 13 and comprising a separator 51, a shutoff valve 52, a slit valve 43, a groove valve 54, and a backup valve 55 which are disposed inwardly of the leg or the circumferential wall of the valve guide. The slit valve 53 is of the same construction as that of the slit valve 18 illustrated in FIG. 2. The groove valve 54 is sandwiched between the slit valve 53 and the backup valve 55, and the shutoff valve 52 is sandwiched between the slit valve 53 and the separator 51. The separator 51 is vertically slidably fitted within the leg of the valve guide. As shown in FIGS. 17A and 17B, the groove valve 54 comprises a thinner outer ring 54a and a thicker inner ring 54b which are integrally coupled to each other by a radial joint arm 54d, the outer and inner rings 54a, 54b defining an arcuate groove 54c therebetween.

Figure 18:
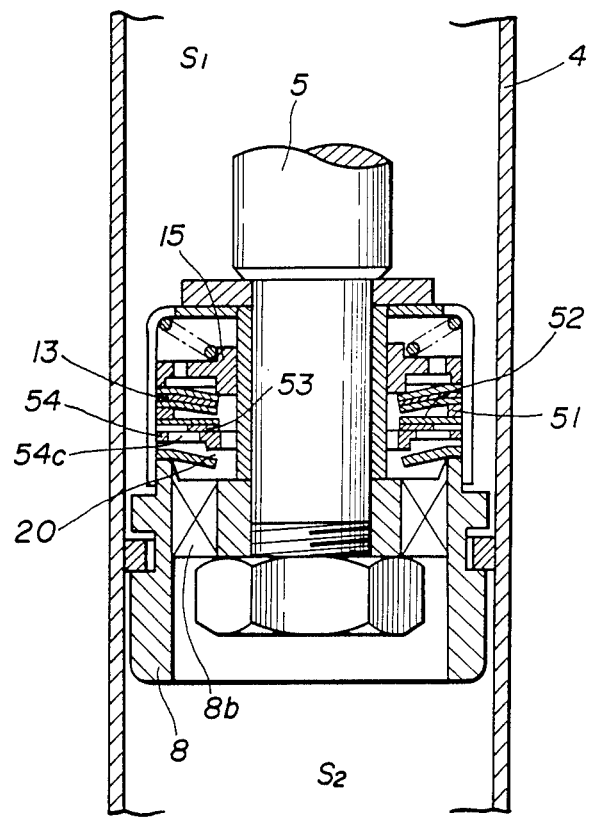
FIG. 18 is an enlarged fragmentary cross-sectional view showing the valve mechanism of FIG. 16 when a piston moves in an extremely-low/low speed range in an expansion stroke.

Right after the upward expansion stroke of the piston 8 begins, hydraulic pressure in the upper hydraulic chamber S1 is not high enough to cause the inner peripheral portion of the backup valve 44 to flex downwardly. Therefore, as shown in FIG. 16, no oil passage or gap is present which would otherwise provide fluid communication between the upper and lower hydraulic chambers S1, S2. As the piston 8 reaches the extremely low speed on its upward travel, a pressure builds up in the grooves 54c communicating with the upper hydraulic chamber S1. Therefore, as shown in FIG. 18, the inner peripheral portion of the backup valve 55 is flexed downwardly, defining an oil passage 20 between itself and the inner peipheral portion of the groove valve 54. As shown in FIG. 7, the damping force increases from a value greater than zero because of formation of the oil passage 20.

The valve mechanism shown in FIG. 16 also offers the same advantages as those of the valve mechanism 10 shown in FIG. 2. In addition, the separator 51 and the shutoff valve 52 may be of simple shapes.

Figure 19:
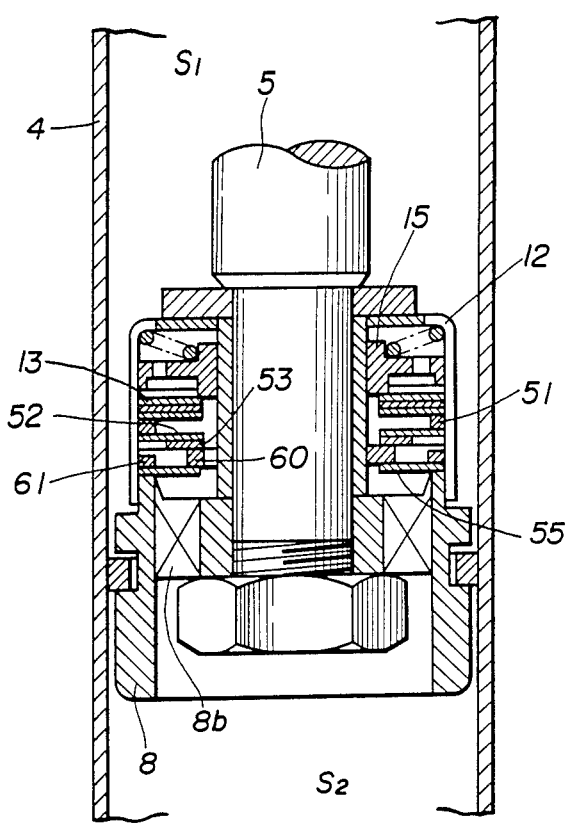
FIG. 19 is a cross-sectional view of a valve mechanism having a modified groove valve.
Figure 20A:
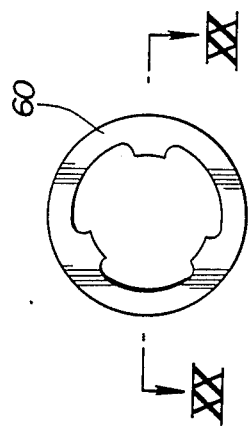
FIG. 20A is a bottom view of an inner ring of the groove valve shown in FIG. 19.
Figure 20B:
FIG. 20B is a cross-sectional view taken along line XX—XX of FIG. 20A.
Figure 21A:
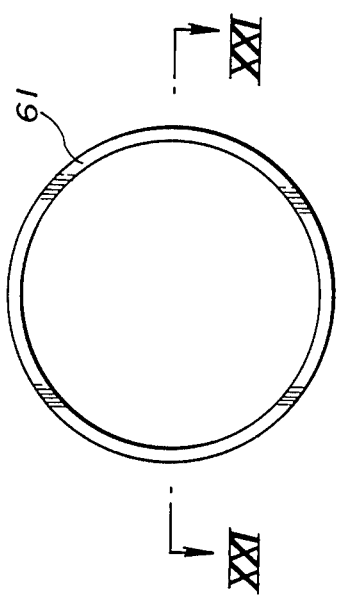
FIG. 21A is a bottom view of an outer ring of the groove valve shown in FIG. 19.

A valve mechanism shown in FIG. 19 has a modified groove valve composed of an inner ring 60 and an outer ring 61 which are separate from each other. Those parts shown in FIG. 19 which are identical to those of FIG. 16 are denoted by identical reference numerals and will not be described in detail. As illustrated in FIGS. 20A and 20B, the inner ring 60 has three teeth projecting radially inwardly in slidable contact with the outer peripheral surface of the valve collar. The outer ring 61 is of a simple ring shape as shown in FIGS. 21A and 21B.

Figure 21:
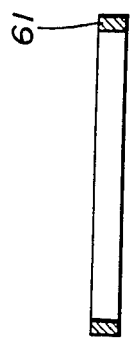
FIG. 21B is a cross-sectional view taken along line XXI—XXI of FIG. 21A.
Figure 22:
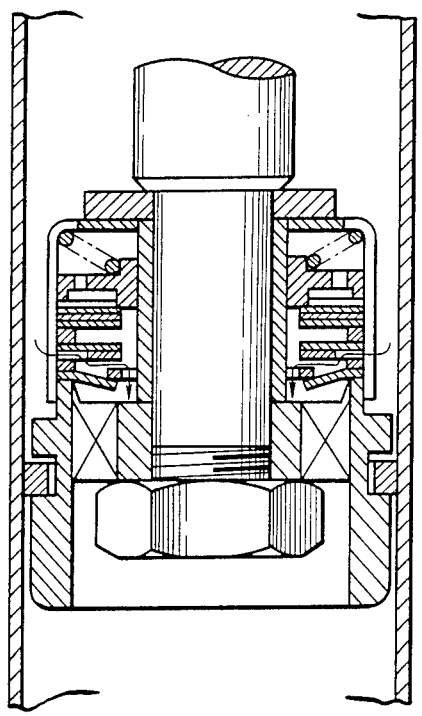
FIG. 22 is an enlarged fragmentary cross-sectional view showing the valve mechanism of FIG. 19 when a piston moves in an extremely-low/low speed range in an expansion stroke.

When the piston 8 moves in the extension stroke at the extremely low speed, a pressure buildup is developed in a small chamber defined between the outer peripheral surface of the inner ring 60 and the inner peripheral surface of the outer ring 61 and held in communication with the upper hydraulic chamber S1. As shown in FIG. 21, the inner peripheral portion of the backup valve 55 is flexed downwardly under such a pressure increase for thereby displacing the inner ring 60 downwardly. As a result, the small chamber is brought into communication with the lower hydraulic chamber S2 through an oil passage now defined between the inner peripheral surface of the inner ring 60 and the outer peripheral surface of the valve collar. The working oil in the upper hydraulic chamber S1 then flows into the lower hydraulic chamber S2 as indicated by the arrows in FIG. 22.

The valve mechanism shown in FIG. 19 also offers the same advantages as those of the valve mechanism 10 shown in FIG. 2. Moreover, the groove valve may be constructed of the rings 60, 62 of simple shapes.

While various modified subvalves are shown above, it is to be understood that further subvalve modifications can readily be provided.

The valve mechanism according to the present invention may be of a simpler arrangement than described above. For example, the subvalve 33 and the main valve 32 of the valve mechanism 30 may be constructed of a single thick valve member which is normally urged downwardly in the valve guide 31 by the spring. Such a valve member may have two orifices with their lower openings closed by reed valve members. The orifices and the associated reed valve members serve respectively as a subvalve operable in the extremely-low/low speed range and a main valve operable in the medium-/high speed range. Therefore, the present invention is essentially directed to a one-way damping valve mechanism for a hydraulic damper, which can generate a step-wise damping force only when the piston moves in a prescribed direction, and virtually does not produce a damping force when the piston moves in the opposite direction.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A one-way damping valve mechanism in a hydraulic damper, said damper having a cylinder, a piston slidably mounted within said cylinder, and a piston rod having an inner end on which said piston is mounted, said valve mechanism coupled to the piston and dividing said cylinder into first and second hydraulic chambers, said valve mechanism being arranged to produce a damping force when said piston is moved in a first direction to move hydraulic fluid from said first hydraulic chamber into said second hydraulic chamber, said valve mechanism comprising:
- a subvalve for defining a first hydraulic passageway for generating a first damping force when said piston moves at an extremely low speed in said first direction; and
- a main valve for defining a second hydraulic passageway for generating a second damping force when said piston moves in a medium/high speed range in said first direction the first and second hydraulic passageways defining separate and parallel hydraulic fluid paths.

2. A one-way damping valve mechanism according to claim 1, further including:
- a valve guide coupled to the piston in the first hydraulic chamber, said valve guide having openings for providng a substantially resistance free path for hydraulic fluid flow therethrough, said subvalve and said main valve being slidably mounted in said valve guide;
- means for urging said subvalve and said main valve toward said second hydraulic chamber with a relatively small force so that said subvalve and said main valve are positioned between said openings and said second hydraulic chamber;
- means for limiting movement of said subvalve and said main valve toward said second hydraulic chamber; and
- wherein when said piston moves in a direction opposite to said first direction hydraulic fluid flows from said second hydraulic chamber into said first hydraulic chamber, and said subvalve and said main valve move toward said first hydraulic chamber against the bias of the urging means so that said second hydraulic chamber is brought into direct communication with said first hydraulic chamber through the openings of said valve guide for causing the hydraulic fluid to flow substantially resistance free into said first hydraulic chamber.

3. A one-way damping valve mechanism according to claim 1, wherein said subvalve and said main valve are mounted on said piston rod.

4. A one-way damping valve mechanism according to claim 1, wherein said subvalve and said main valve are mounted on said cylinder.

5. A one-way damping valve mechanism according to claim 2, further including a separator interposed between said subvalve and said main valve.

6. A one-way damping valve mechanism according to claim 2, wherein said subvalve comprises a disc-shaped slit valve and a disc-shaped backup valve which are superposed on each other.

7. A one-way damping valve mechanism according to claim 2, wherein said subvalve comprises a disc-shaped shutoff valve, a disc-shaped backup valve, and a groove valve having slits and grooves communicated with said openings, said groove valve being sandwiched between said shutoff valve and said backup valve.

8. A one-way damping valve mechanism according to claim 2, wherein said subvalve comprises a disc-shaped slit valve, a disc-shaped backup valve, a groove valve sandwiched between said slit valve and said backup valve, and a shutoff valve superposed on said slit valve remotely from said groove valve.

* * * * *

UNITED STATES PATENT AND TRADEMARK OFFICE
CERTIFICATE OF CORRECTION

PATENT NO. : 4,809,828
DATED : March 7, 1989
INVENTOR(S) : Kazuo Nakazato

It is certified that error appears in the above-identified patent and that said Letters Patent is hereby corrected as shown below:

Column 2, line 24, "storke" should read --stroke--.

Column 2, line 31, "this is" should read --that is--.

Column 3, line 10, "cylinder" should read --piston--.

Column 5, line 19, "0.01 m/s" should read --0.1 m/s--.

Column 5, line 50, "main valve 14" should read --main valve 13--.

Column 5, line 66, "anular" should read --annular--.

Column 7, line 66, "substantailly" should read --substantially--.

Signed and Sealed this

Twelfth Day of December, 1989

*Attest:*

JEFFREY M. SAMUELS

*Attesting Officer*     *Acting Commissioner of Patents and Trademarks*